(No Model.)
C. A. VON WELSBACH.
METHOD OF REINFORCING MANTLES OF REFRACTORY INCANDESCING EARTHS.
No. 396,347. Patented Jan. 15, 1889.
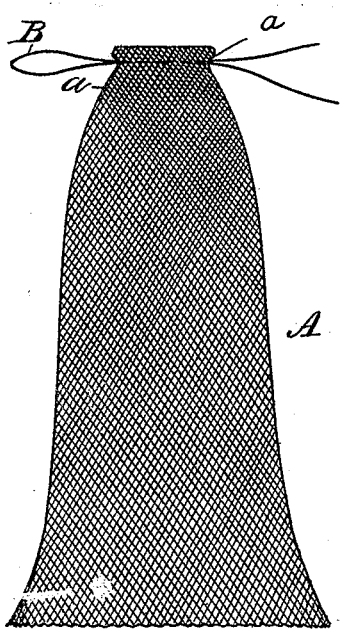
Witnesses.
Robert Garrett,
Dennis Sumby.
Inventor:
Carl Auer von Welsbach.
By James L. Norris
Atty.

United States Patent Office.

CARL AUER VON WELSBACH, OF VIENNA, AUSTRIA-HUNGARY, ASSIGNOR TO THE WELSBACH INCANDESCENT GAS LIGHT COMPANY, OF JERSEY CITY, NEW JERSEY.

METHOD OF RE-ENFORCING MANTLES OF REFRACTORY INCANDESCING EARTHS.

SPECIFICATION forming part of Letters Patent No. 396,347, dated January 15, 1889.

Application filed March 31, 1888. Serial No. 269,201. (No model.)

*To all whom it may concern:*

Be it known that I, CARL AUER VON WELSBACH, a subject of the Emperor of Austria, residing at Vienna, Austria-Hungary, have invented new and useful Improvements in the Method of Re-enforcing Mantles of Refractory Incandescing Earths for Attachment of Suspending-Wires, of which the following is a specification.

The object of my invention is to strengthen and re-enforce that portion of an incandescing mantle or hood through which is passed the platinum wire used for attaching the mantle to its support. In the Welsbach incandescing gas-light system a mantle or hood composed of refractory earth is usually suspended over a gas-burner by means of platinum wire passed through the upper end of a supporting-rod. The mantle or hood is made by saturating a textile fabric with a solution of the salts of refractory earths capable of giving light by incandescence, the textile material being subsequently burned away, so that the mantle when ready for use consists of a net-work of earthy substance, which is fragile and liable to be torn or broken at the point where the platinum wire is inserted. I have found that this difficulty can be obviated by applying to the upper end of the mantle a strengthening or re-enforcing fluid composed of a solution of magnesium and aluminum salts, which will strengthen and re-enforce that part of the mantle to which the platinum wire is attached and prevent the wire from tearing the fragile structure.

The annexed drawing shows a view of a mantle treated according to my present invention, the re-enforced or strengthened portion being indicated by shading.

In carrying my invention into effect I prefer to use a solution of magnesium nitrate and aluminum nitrate in water, no particular proportions being necessary, though I prefer an excess of the magnesium salt. The upper or attaching end of the mantle is dipped into the strengthening-fluid, which has the effect of hardening the mantle, so that it will resist any tendency to strain incurred by the insertion of the platinum wire. By thus strengthening the mantle and lessening the liability of breakage it is obvious that considerable economy in the manufacture and use of these fragile articles will be effected.

The following-named solution gives very good results when used as a strengthening or re-enforcing application in the manner above described: five parts magnesium nitrate, one-fourth part aluminum nitrate, and ten parts water. It will be understood, however, that I do not confine myself to these proportions nor to a fluid containing only the bodies above named, as other salts of magnesium and aluminum may be used either alone or in combination with bodies hereinafter named.

Some of the following-named bodies have little importance as incandescent bodies by themselves; but as in combination they emit a plentiful light and readily vitrify, they may be employed with advantage for causing the mantle to adhere to its suspending-wire. Among these bodies may be mentioned beryllium oxide with thorinum oxide or zirconium oxide and the combination of these bodies with alumina, magnesia, or lime. Also, niobates of the refractory earths may be combined for this purpose with magnesia or alumina, beryllium oxide, calcium oxide, or cerium oxide. In the same manner as the niobates may also be used the tantalates of cerium, lanthanum, yttrium, or zirconium, with or without magnesia. The silicates, titanates, and phosphates of the refractory earths may also be used, and the several bodies named may be combined with each other in various proportions.

If desired, the upper end of the mantle can be subjected to the heat of a gas-flame subsequent to the application of the strengthening-fluid, so as to convert the salts contained in said fluid into earthy oxides prior to shipment of the mantle; or such heating can be deferred until the mantle is placed over a gas-burner for use, when the salts will become decomposed and converted in a few minutes into light-emitting oxides.

In the annexed drawing, A designates the mantle; *a*, its upper re-enforced portion, which has been strengthened by the application of the described fluid, and B the platinum suspending-wire passed through said re-enforced or strengthened portion of the mantle.

What I claim as my invention is—

1. The method of strengthening or re-enforcing mantles or hoods of refractory incandescing material at the point where a suspending-wire is inserted, which consists in applying to that part of the mantle or hood a strengthening-fluid of the salts of refractory earths in solution, substantially as described.

2. The method of strengthening or re-enforcing mantles or hoods of refractory incandescing earth at the point where a suspending-wire is attached, which consists in applying to that part of the mantle or hood a solution of magnesium nitrate and aluminum nitrate, substantially as described.

In testimony whereof I affix my signature in presence of two witnesses.

CARL AUER VON WELSBACH.

Witnesses:
FRED WILLIAMS,
EDMUND JUSSEN.